Feb. 5, 1929.  1,701,340
H. F. SCHMIDT
INTERNAL COMBUSTION ENGINE AND GENERATOR
Original Filed June 24, 1926   2 Sheets-Sheet 2

WITNESSES:
E. Lutz

INVENTOR
H.F. Schmidt
BY
A. B. Reavis
ATTORNEY

Patented Feb. 5, 1929.

1,701,340

UNITED STATES PATENT OFFICE.

HENRY F. SCHMIDT, OF LANSDOWNE, PENNSYLVANIA, ASSIGNOR TO WESTINGHOUSE ELECTRIC & MANUFACTURING COMPANY, A CORPORATION OF PENNSYLVANIA.

INTERNAL-COMBUSTION ENGINE AND GENERATOR.

Original application filed June 24, 1926, Serial No. 118,257. Divided and this application filed December 1, 1927. Serial No. 237,011.

In my application, Serial No. 118,257, filed June 24, 1926, of which this application is a division, I have disclosed and claimed a polyhedral form of internal combustion engine which embodies a prismatic frame surrounded by and supporting two-cycle internal combustion engine means, the latter including horizontally disposed opposed piston type cylinders and vertical crank shafts. The frame is formed to provide a scavenge air supply chamber from which air is supplied to the engine cylinders for scavenging purposes. In the parent application, the principal aspect of the invention is the engine means; and, in this application, the principal aspect is the relative arrangement of an engine of this character with respect to a generator. While the polyhedral engine is unique from the point of view that the engine supporting frame may be formed to provide a scavenge air supply chamber, the frame is peculiarly suitable as a housing for an electric generator, as an electric generator, from a mechanical point of view, is quite simple, the parts lending themselves very well to being located in the tubular element or frame; and, as the inlet and outlet elements for a generator are merely conductors, very little modification of the housing construction is required. Accordingly, it is an object of my present invention to provide a compact prime mover and generator organization wherein the generator is arranged within a tubular housing or frame member and engine means is carried by the tubular member or frame and connected to the generator, whereby a combined unit, with single supporting means, may be provided which requires little if any more space than an engine of this type.

A further object of my invention is to provide a combined internal combustion engine and generator installation wherein the engine supporting frame cooperates with the generator to provide a scavenging air supply chamber for the engine.

Figure 1:
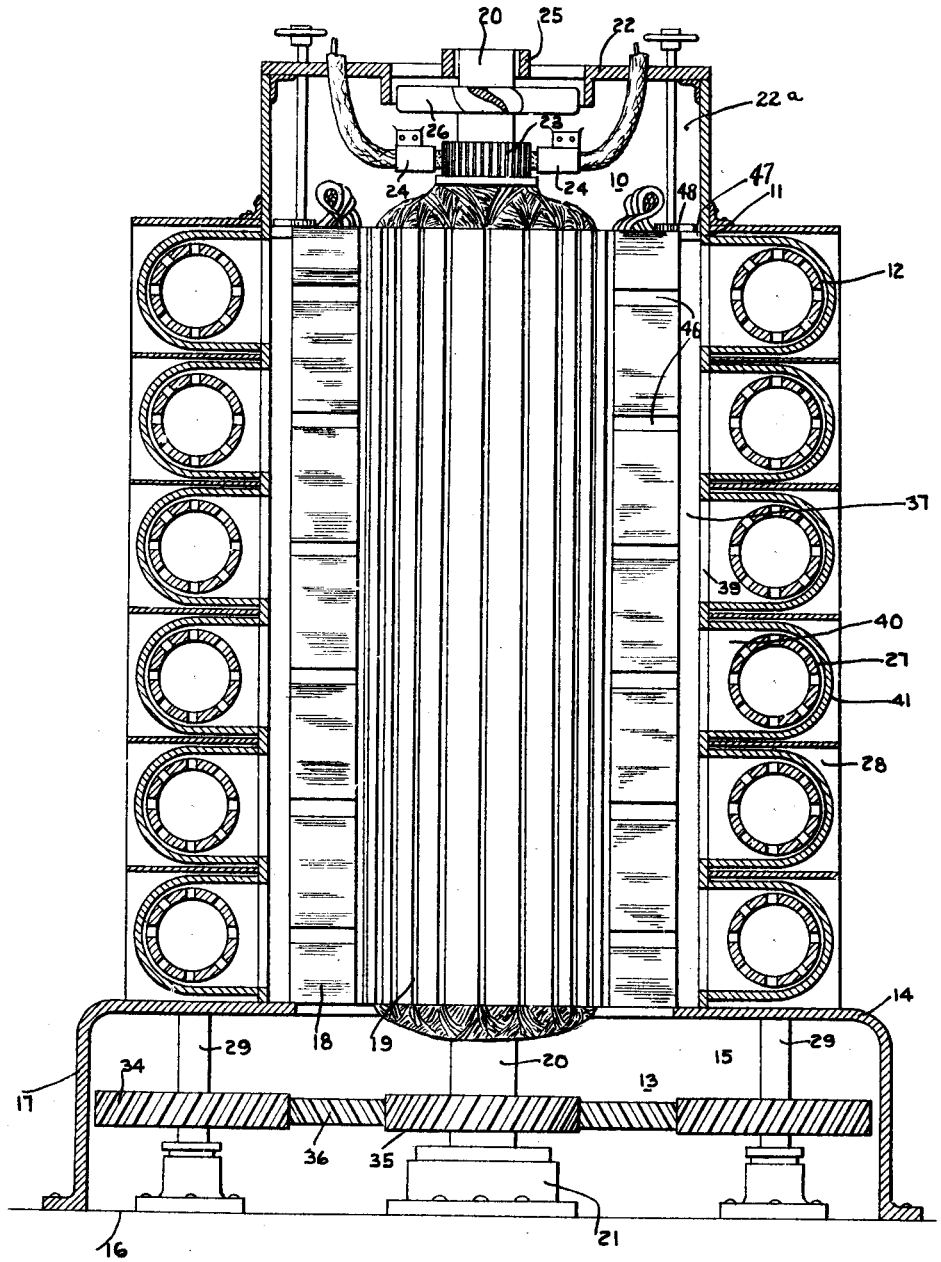
Figure 2:
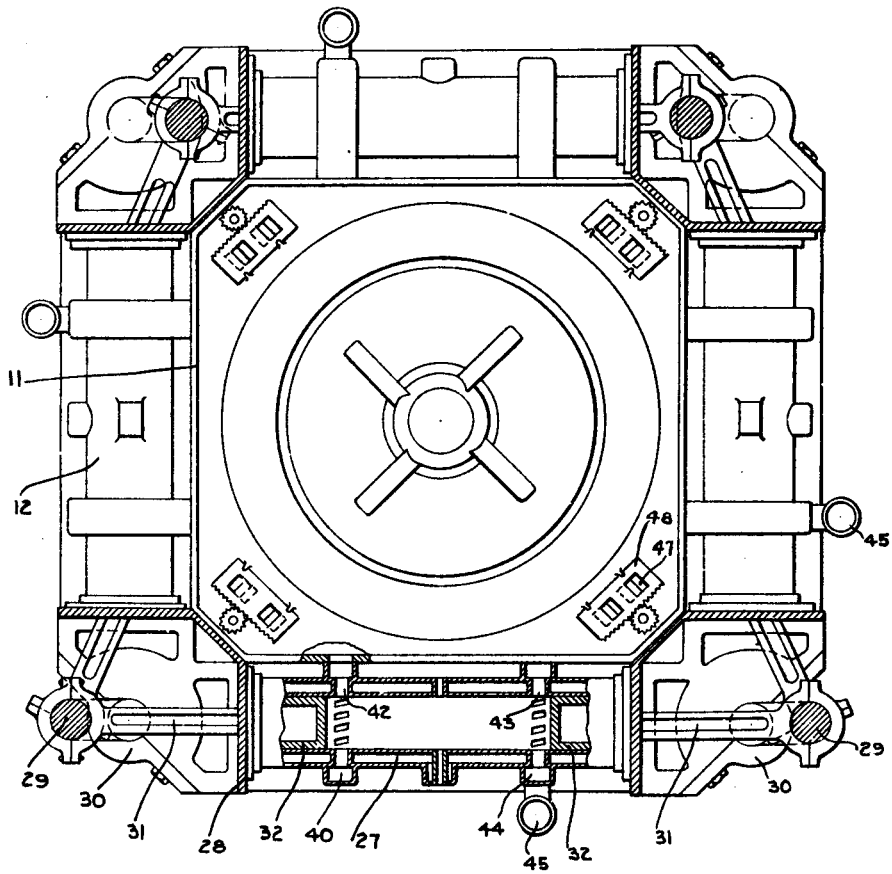

These and other objects are effected by my invention as will be apparent from the following description and the accompanying drawings, forming a part of this application, in which:

Fig. 1 is a vertical sectional view of power plant apparatus made in accordance with my invention; and, Fig. 2 is a view, partly in plan and partly in section, taken substantially along the line II—II of Fig. 1.

Referring now to the drawings more in detail, I show a vertical generator, at 10, a housing or tubular member 11, telescopically arranged with respect to the generator, and engine means 12 disposed about and carried by the tubular housing member 11, the engine means being connected by gearing 13 to the generator.

As may be seen from Fig. 1, the generator, at 10, and the engine means 12 are carried by a base construction 14 providing a chamber 15 for the gearing 13, the base construction consisting of a bed or foundation member 16 and an upper housing member 17.

The generator, at 10, consists of vertical stator and rotor elements 18 and 19, respectively, the lower end portion of the rotor shaft 20 being preferably carried by a step bearing 21 on the foundation member 16, while the stator element is supported at its lower end by the housing member 17.

The vertical tubular or housing element 11 surrounds the stator element 18. An upper cover member 22 cooperates with the upper end of the tubular member to provide a space for the commutator 23 and the brushes 24 and to provide a bearing 25 for the upper end of the armature shaft 20. Incidentally, I prefer to provide an impeller element 26 on the armature shaft 20 immediately below the bearing 25 for the purpose of inducing a current of air, as set forth in my application aforesaid.

The engine means disposed about and carried by the tubular element or housing 11 consists of a plurality of open-ended, horizontal cylinders 27, having the ends thereof supported by flanged members 28, and vertical crank shafts 29 carried by bearings 30 and connected by rods 31 to opposed pistons 32 in the cylinders 27. The lower ends of the crank shafts 29 extend into the chamber 15 and are connected to tooth gears 34, each of the latter being connected to a gear 35 of the armature shaft 20, preferably through the intermediary of idler gears 36.

The tubular element 11, not only telescopes about the stator 18 of the generator, but also cooperates with the latter to provide a scavenge air supply chamber 37 to which air is supplied by any suitable means, for example, by the impeller 26. Air from the supply chamber 37 enters through openings 39 in the tubular member 11 and passes into the spaces 40 provided by the hoods 41 arranged about the cylinders 27. Each cylinder is provided with scavenge air inlet openings 42 in communication with the hood spaces 40 and is provided with exhaust openings 43, the latter communicating with exhaust hoods 44 leading to exhaust manifold structures 45. In operation, the inlet and exhaust openings 42 and 43 are covered and uncovered by the opposed piston 32.

While I have described the impeller 26 as air-translating means for supplying scavenging air to the chamber 37; such impeller may also furnish cooling air to the generator; and, in he latter event, air after passing through the generator may pass to the scavenging air supply chamber. Referring to Fig. 1, I show the upper ends of the stator and rotor freely exposed to the space or chamber supplied with air by the impeller. Air may pass between the stator and rotor elements for cooling the latter. The stator is provided with passages 46 so that cooling air may pass to the chamber 37. To insure that sufficient air may be supplied to the chamber 37, I show openings 47 affording direct communication between the chambers 22ª and 37; and dampers 48 may cooperate with such openings to insure a sufficiency of scavenging air. It is to be understood that, so far as my invention in its broadest aspect is concerned, this series use of air is not essential; it being sufficient that the supporting frame cooperates with the generator stator to provide a scavenging air supply chamber to which air is supplied an any suitable manner.

From the foregoing, it will be apparent that I have provided a very compact form of prime mover generator organization which consists of a polyhedral internal combustion engine arrangement telescoping over a generator and the engine means being connected by suitable gearing to the rotor element of the generator. In addition to affording sufficient space for the generator, adequate space is left to provide for a scavenge air supply chamber. In view of the fact that, for the power developed; a polyhedral type of engine is very compact, it will be apparent that this form of engine is peculiarly suitable to receive a generator without the provision of any additional space therefor or without the provision of additional foundation or supporting structure. In other words, with the present arrangement, I have provided, what might be termed, a "two-in-one" internal combustion engine and generator organization.

It is to be noted however, that while I have shown and described an electrical generator disposed within the polyhedron defined by the engine parts; that my invention, in certain of its broad aspects, is not limited to the combination of this particular machine with the polyhedral engine. I may substitute, for the generator, any machine, which requires for its operation the greater portion of the power developed by the engine and which is related to the engine in substantially the same way as the generator, such, for example, as a pump or a blower.

While I have shown my invention in but one form; it will be obvious to those skilled in the art that it is not so limited, but is susceptible of various changes and modifications, without departing from the spirit thereof, and I desire, therefore, that only such limitations shall be placed thereupon as are imposed by the prior art, or as are specifically set forth in the appended claims.

What I claim is:

1. In power plant apparatus, the combination with an electric generator having a stator and a rotor, of engine means surrounding the stator and including a plurality of crank shafts whose axes are substantially parallel to the rotor axis, and means for transmitting power from the crank shafts to the generator rotor.

2. In power plant apparatus, the combination of a base construction providing a chamber; a vertically disposed electric generator having stator and rotor elements supported by the base construction and the rotor element extending into the chamber; a prismatic frame surrounding the stator element, engine means surrounding the frame and carried thereby and including a plurality of vertical crank shafts extending into the chamber, and means arranged in the chamber for transmitting power from the crank shafts to the rotor element of the generator.

3. In power plant apparatus, the combination of an electric generator, engine means surrounding and telescopically arranged with respect to the generator and including a plurality of crank shafts, and means for transmitting power from the crank shafts to the generator.

4. In power plant apparatus, the combination of a vertically disposed electric generator, a frame surrounding the generator, engine means surrounding the frame and including vertical crank shafts, and means for transmitting power from the crank shafts to the generator.

5. In power plant apparatus, the combination of a vertically disposed electric generator, a frame surounding the generator, engine means disposed about and carried by the frame and including a plurality of vertical crank shafts, and means for transmitting power from the crank shafts to the generator.

6. In a power plant construction, the combination of an electric generator including stator and rotor elements, a gear member carried by the rotor element adjacent to one end of the construction, a frame telescoping over the stator element, means for supporting the stator element and the frame in fixed relative positions, engine means disposed about and carried by the frame and including a plurality of crank shafts extending parallel to the rotor axis, and gearing means cooperating with the crank shafts at the same end of the construction as said gear member for transmitting power to the latter.

7. In power plant apparatus, the combination of a vertically disposed generator having output leads at its upper end and a driving gear member at its lower end, a tubular supporting member surrounding the generator, supporting means for the tubular member and the generator and providing a chamber within which is arranged said driving gear member, engine means disposed about and carried by the tubular member and including a plurality of vertical crank shafts extending into said chamber, and gearing means for connecting the crank shafts to said driving gear member.

8. In power plant apparatus, the combination of a generator, an engine supporting frame cooperating with the generator to provide a scavenge air supply chamber, internal combustion engine means supported by said frame, means for supplying scavenging air from said chamber to the cylinders of the engine means, means for driving the rotor of the generator from the engine means, and means driven from the generator rotor for supplying air under pressure to said chamber.

9. In power plant apparatus, the combination of a vertically disposed generator, a vertically disposed engine supporting frame cooperating with the generator to provide a scavenge air supply chamber, engine means surrounding and supported by said frame and including horizontally disposed cylinders, means for supplying scavenging air from said chamber to the cylinders, motion transmitting means between the engine means and the generator, and means operated from the generator for supplying air under pressure to said chamber.

10. The combination, with an internal combustion engine including a plurality of crank shafts, of a generator, means for transmitting motion from the crank shafts to the generator, and scavenging apparatus for the engine including pressure-developing means driven from the generator.

11. In power plant apparatus, the combination of a generator, internal combustion engine means of the opposed piston and polygon type including a plurality of crank shafts, gearing for connectnig the crank shafts to the generator, scavenging apparatus for supplying scavenging air to the cylinders and including a blower having a runner axially aligned with the generator, and means for transmitting motion from the generator to the runner.

12. In a power generating organization, the combination with a closed prismatic frame structure, of a plurality of opposed-piston internal combustion power cylinders disposed transversely across the side faces of the structure and having their pistons coupled to crank shafts arranged along parallel corners of the structure, an electric generator disposed within said frame structure, means for driving said generator from said crank shafts, a fan member carried by the generator shaft and adapted to force air therethrough, means for subsequently supplying said air to said cylinders for the scavenging thereof, and means for passing a portion of the air from said fan member directly to said cylinders.

13. In a power generating organization, the combination with a closed prismatic frame structure with its axis substantially vertically disposed, of a plurality of opposed-piston internal combustion power cylinders disposed transversely across the faces thereof and having their pistons coupled to crank shafts arranged along the corners thereof, an electric generator disposed within said frame structure and having its axis substantially coinciding with the axis thereof, means for driving said generator from said crank shafts, a fan member carried by the generator shaft and adapted to force air therethrough, means for subsequently supplying said air to said cylinders for the scavenging thereof, an adjustable damper means for passing an adjustable portion of the air from said fan member directly to said cylinders.

14. In a power generating organization, the combination of a closed prismatic frame structure, a plurality of open-ended internal combustion power cylinders disposed transversely across the faces of the structure, crank shafts disposed along parallel corners of said frame structure, opposed pistons in the cylinders and connected to the crank shafts, an electric generator disposed within said frame structure, means for transmitting power from the crank shafts to the generator, means for blowing air through said generator for cooling the latter, and means for thereafter delivering air from the generator to said cylinders for scavenging the latter.

15. In a power generating organization, the combination of a closed prismatic frame structure, a plurality of open-ended internal combustion power cylinders disposed transversely across the side faces of the frame structure, crank shafts disposed at parallel corners of said frame structure, opposed pistons in the cylinders and connected to the crank shafts, an electric generator disposed within said frame structure, means for transmitting power from the crank shafts to the generator, means operated by the generator shaft for forcing air through the generator, and means for supplying air from the generator to the cylinders for scavenging the latter.

16. In power plant apparatus requiring air in its operation, the combination of a polyhedral engine, a generator telescopically arranged with respect to the engine, means for transmitting motion from the engine to the generator, and air translating means driven from the generator for supplying the required air.

17. In power plant apparatus, the combination of a polyhedral engine including a plurality of corner crank shafts, gearing for interconnecting the crank shafts, a generator telescopically arranged with respect to the engine and operatively connected to the gearing, a blower having a runner axially alined with the generator, and means for transmitting motion from the generator to the runner.

18. In power plant apparatus, the combination of engine means embodying a plurality of alternately arranged cylinders and crank shafts, means for supporting the cylinders and crank shafts so as to define a polyhedron with the crank shafts at parallel corners of the latter, a driven machine extending within the polyhedron and including stationary and rotary elements, the stationary element being supported by said supporting means, transmission means for interconnecting the engine crank shafts, and means for operatively connecting the rotary element of the machine to the engine.

In testimony whereof, I have hereunto subscribed my name this 23rd day of November, 1927.

HENRY F. SCHMIDT.